Aug. 31, 1926.

H. E. MILLER ET AL 1,598,489

ELECTRICAL MEASURING INSTRUMENT

Filed Jan. 22, 1925   3 Sheets-Sheet 3

WITNESSES:

INVENTORS
Harry E. Miller and
Paul Paszkowski
BY
Wesley G. Carr
ATTORNEY

Patented Aug. 31, 1926.

1,598,489

UNITED STATES PATENT OFFICE.

HARRY E. MILLER, OF GLEN RIDGE, AND PAUL PASZKOWSKI, OF IRVINGTON, NEW JERSEY, ASSIGNORS TO WESTINGHOUSE ELECTRIC & MANUFACTURING COMPANY, A CORPORATION OF PENNSYLVANIA.

ELECTRICAL MEASURING INSTRUMENT.

Application filed January 22, 1925. Serial No. 4,005.

Our invention relates to electrical measuring instruments and particularly to improved registers for watthour meters or other integrating instruments.

One object of our invention is to provide an integrating instrument having a removable register of such construction that it may be manufactured in quantities and mounted interchangeably on any instrument.

A further object of our invention is to provide a register for an integrating instrument in which the registering pointers are pivoted between a dial plate and a back plate, one of which is provided with integral lugs to which the other plate is secured.

Our invention is applicable to watthour meters that are provided with the usual gear-train registering mechanism. The register is detachably mounted upon the frame of the watthour meter, cooperating pin and recessed members being provided on the register and frame for so accurately positioning the gear train of the register that it will mesh properly with the integrating element of the watthour meter. Preferably, the first gear of the register is mounted on a shaft upon which a worm meshing with a worm-wheel is secured. The holes for the other shafts of the gear train are drilled in such manner that the gear wheels will mesh properly. The worm shaft, however, is so located that the first gear of the register will mesh properly with the integrating element of the watthour meter. The construction of the worm and worm-wheel is such that considerable latitude is permitted in the arrangement of these elements. Accordingly, slight variations in the relative positions of the worm and worm wheel shafts will not prevent the proper cooperation thereof.

Heretofore, it has been customary to bolt the dial plate of the register to the frame of the register or of the meter, a suitable spacing element being interposed between the plate and the frame. In accordance with our invention, the dial plate is provided with integral spacing lugs, which construction results in simplification and strengthening of the structure.

Figure 1:
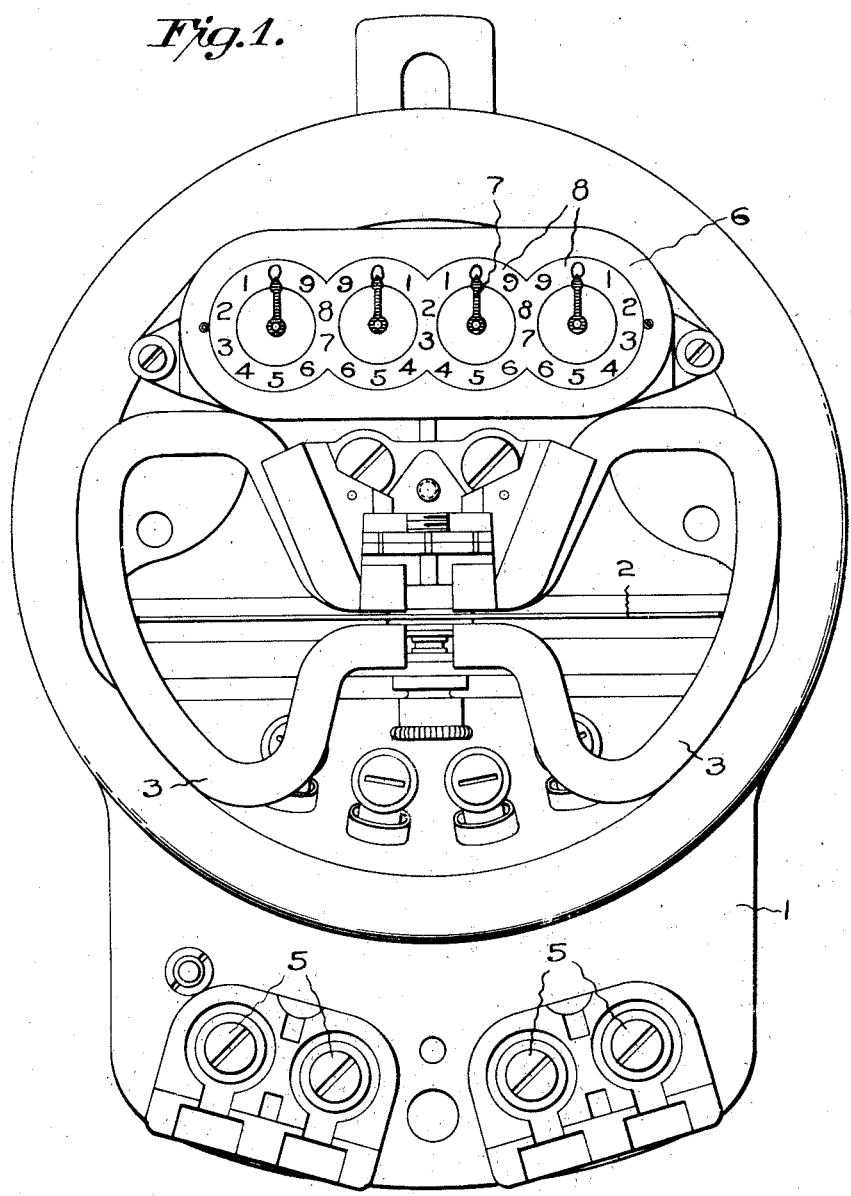
Figure 2:
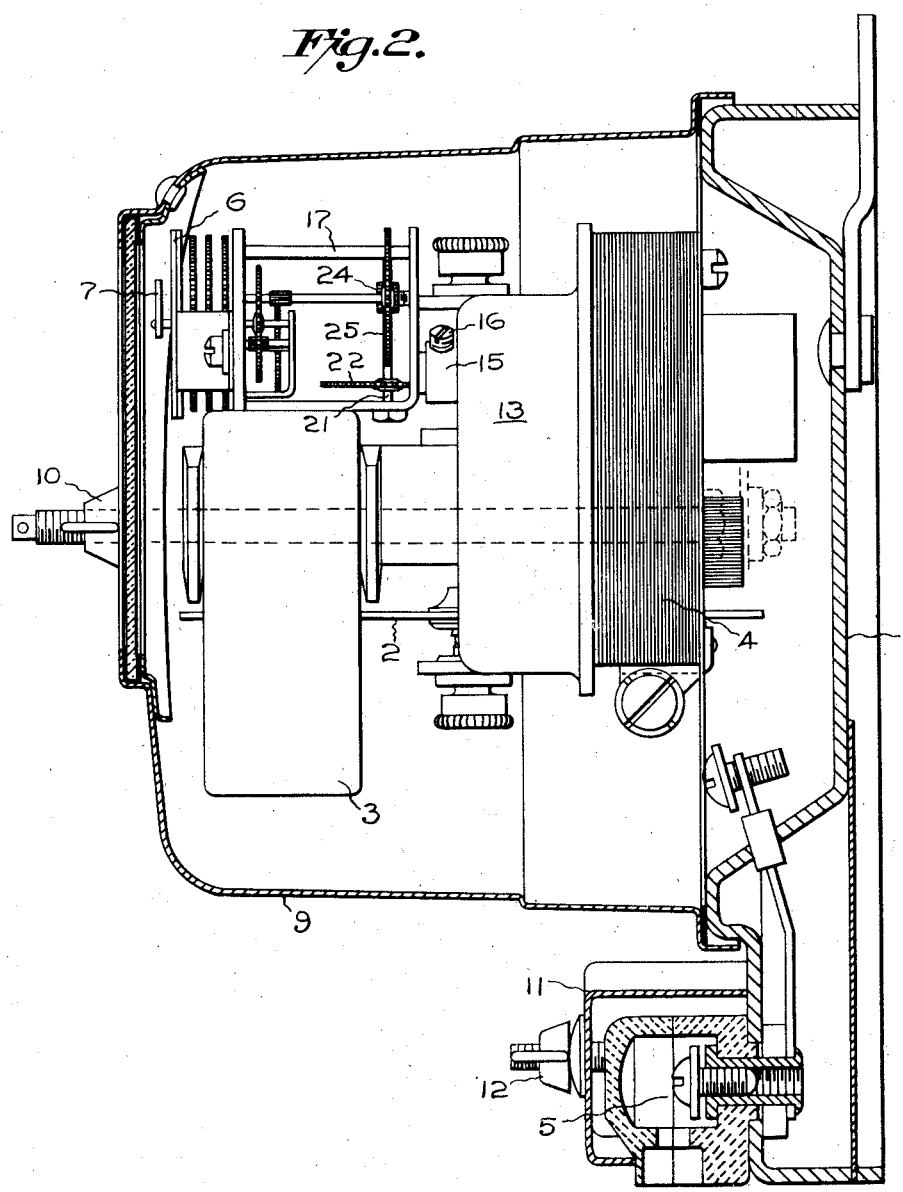
Figure 3:
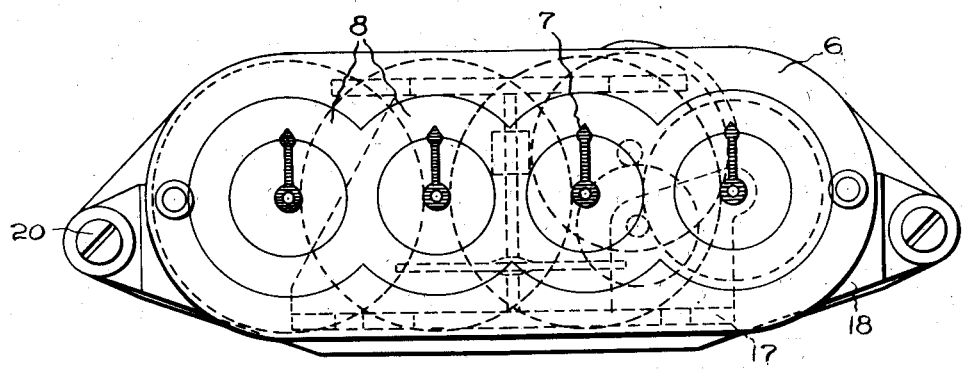
Figure 4:
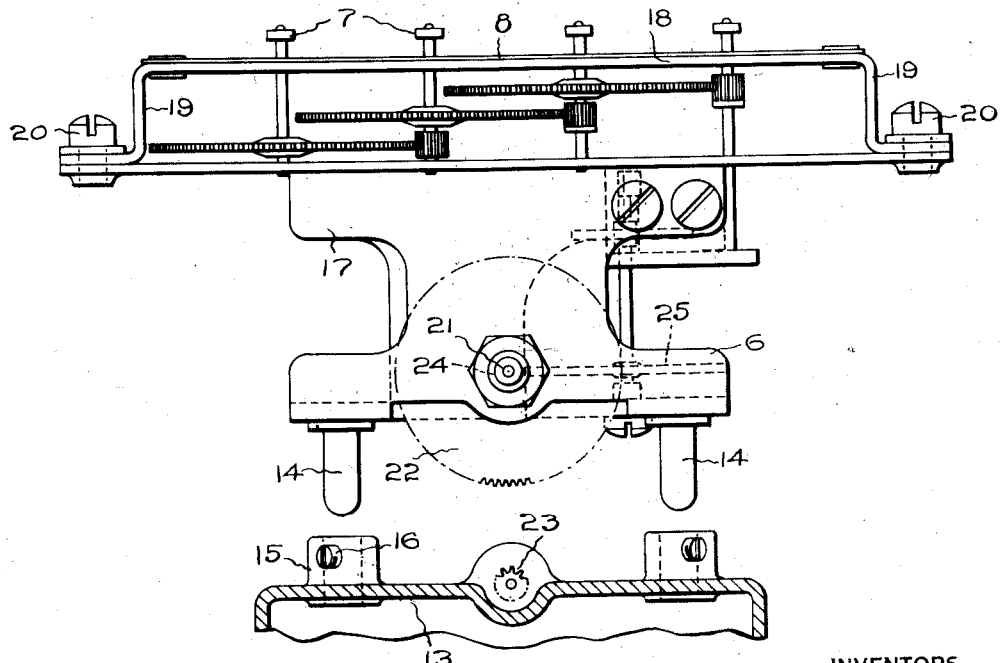

In the accompanying drawings, Fig. 1 is a front elevational view of a single-phase, alternating-current watthour meter embodying our invention;

Fig. 2 is a side view, partially in section and partially in elevation, of the meter shown in Fig. 1; and Figs. 3 and 4 are enlarged front and bottom views, respectively, of the register embodying our invention.

Referring to Figs. 1 and 2, a single-phase alternating-current watthour meter of the induction type is shown having a base 1, a rotatable armature 2 mounted thereon, permanent magnets 3 and an electromagnet 4 for controlling the movement of the armature 2, the electromagnet being connected to terminals 5 that are mounted on the base. A register 6 is connected to the shaft upon which the armature 2 is mounted to record the number of revolutions thereof, suitable registering pointers 7 and dials 8 being provided for that purpose.

As shown in Fig. 2, the rotating armature 2 and the register 6 may be enclosed by a suitable cover 9 secured to the base by thumb screws 10. The terminals 5 may be likewise enclosed by a suitable cover plate 11 that is secured in position by a thumb screw 12. The register 6 is supported on a frame 13 that is mounted on the base, the frame of the register being provided with projecting pins 14 (see Fig. 4) that are adapted to cooperate with recessed lugs 15 on the frame 13. Set screws 16 are provided for locking the register in position.

The register 6 comprises a hollow frame 17 upon which the mounting pins 14 are secured. A dial plate 18 having integral offset lugs 19 for attaching the same to the register frame is mounted upon the frame 17. The dial plate 18 may be fastened to the register frame 17 by screws 20, as shown. The gear train of the register is mounted in the register frame 17 and in the dial plate 18.

In assembling the register, the holes for the shafts of the gear train are drilled in jigs that insure that the respective elements of the gear train will mesh properly, with the exception of the shaft 21 of the first gear wheel 22 of the gear train that is adapted to cooperate with a pinion 23 on the integrating element of the instrument. The holes for the shaft 21 are drilled in a jig cooperating with the mounting pins 14 that insures proper meshing of the gear wheel 22 with the pinion 23, so that the registers will be interchangeable on all instruments.

Upon the shaft 21 is mounted a worm 24 (see Fig. 2) cooperating with a worm-wheel 25 to drive the register. On account of the nature of the engagement between a worm and worm-wheel, the elements 24 and 25 will mesh properly even if the relative positions of the shafts on which said elements are mounted are varied several thousandths of an inch. Accordingly, it is possible to manufacture the registers in quantity, the registers being interchangeable on all of the instruments.

This construction results in a saving in the cost of manufacturing and assembling the watthour meters, inasmuch as the advantages of quantity production may be realized. Furthermore, if a register becomes damaged in service, the meter may be quickly repaired at relatively small expense, which is a considerable advantage. That is, the register may be removed with ease and repaired or a new one substituted without disturbing the calibration of the meter.

Various modifications of the invention will occur to those skilled in the art and such modifications are considered to come within its scope as defined in the appended claims.

We claim as our invention:

1. An electrical measuring instrument comprising a frame, a vertical shaft mounted thereon, a pinion on said shaft, a detachable register on said frame and cooperating pin and recessed members on said register and said frame, said register comprising a gear wheel meshing with said pinion, a worm secured to said gear wheel and a worm-wheel cooperating therewith.

2. An electrical measuring instrument comprising a frame, a shaft mounted thereon, a pinion on said shaft, a register having a gear wheel meshing with said pinion and cooperating pin and recessed members on said frame and register for mounting the register on said frame.

3. An electrical measuring instrument comprising a frame, a shaft mounted thereon, a register driven by said shaft and cooperating pin and recessed members on said frame and register for mounting the register on said frame.

4. An electrical measuring instrument comprising a frame, a pivoted shaft mounted thereon, a register driven by said shaft, cooperating pin and recessed members on said frame and register for mounting the register on said frame and means for securing said register in position.

5. An electrical measuring instrument comprising a frame, two spaced recessed members thereon, a register, two pin members thereon adapted to cooperate with said recessed members and means for securing said frame and register in assembled relation.

6. An electrical measuring instrument comprising a frame, a rotatable element pivoted thereon, a sub-frame having a gear train mounted therein adapted to be driven by said rotatable element and means for detachably securing said sub-frame to said frame, said means comprising cooperating pin and recessed members.

In testimony whereof, we have hereunto subscribed our names this 18 day of December, 1924.

HARRY E. MILLER.
PAUL PASZKOWSKI.